(12) United States Patent
Momonoi et al.

(10) Patent No.: US 9,081,238 B2
(45) Date of Patent: Jul. 14, 2015

(54) LIQUID CRYSTAL OPTICAL ELEMENT AND IMAGE DISPLAY DEVICE

(71) Applicants: Yoshiharu Momonoi, Kanagawa (JP); Ayako Takagi, Kanagawa (JP); Shinichi Uehara, Tokyo (JP); Yuko Kizu, Kanagawa (JP); Masako Kashiwagi, Kanagawa (JP)

(72) Inventors: Yoshiharu Momonoi, Kanagawa (JP); Ayako Takagi, Kanagawa (JP); Shinichi Uehara, Tokyo (JP); Yuko Kizu, Kanagawa (JP); Masako Kashiwagi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 13/689,075

(22) Filed: Nov. 29, 2012

(65) Prior Publication Data

US 2013/0286342 A1    Oct. 31, 2013

(30) Foreign Application Priority Data

Apr. 27, 2012   (JP) ................. 2012-103579

(51) Int. Cl.
*G02F 1/1343*   (2006.01)
*G02F 1/29*     (2006.01)
*G02B 27/22*    (2006.01)
*H04N 13/04*    (2006.01)

(52) U.S. Cl.
CPC ............ *G02F 1/134309* (2013.01); *G02F 1/29* (2013.01); *G02B 27/2214* (2013.01); *H04N 13/0404* (2013.01); *H04N 13/0454* (2013.01)

(58) Field of Classification Search
CPC .. G02F 2001/294; G02F 1/29; G02B 27/2214
USPC ................................. 349/200–202
See application file for complete search history.

(56) References Cited

U.S. PATENT DOCUMENTS

2006/0273284 A1*  12/2006  Hirose ................. 252/299.61
2010/0245743 A1    9/2010  Yokoyama
2011/0084961 A1    4/2011  Son et al.
2011/0157497 A1*   6/2011  Kim ......................... 349/15

(Continued)

FOREIGN PATENT DOCUMENTS

JP   2001-176108 A   6/2001
JP   2010-127976 A   6/2010

(Continued)

OTHER PUBLICATIONS

Office Action for Japanese Patent Application No. 2012-103579, dated Jan. 29, 2013, English Translation pp. 1-6, 9 pages.

(Continued)

*Primary Examiner* — Dennis Y Kim
(74) *Attorney, Agent, or Firm* — Patterson & Sheridan, LLP (57) ABSTRACT

According to one embodiment, liquid crystal optical element includes: first board; second board; liquid crystal layer; first electrodes; second electrodes; third electrodes; and fourth electrode. The liquid crystal optical element generates refractive index distribution functioning as a lens. The first electrodes are at positions corresponding to end portions of the lens and on the liquid crystal layer side of the first board. The second electrodes are at positions corresponding to discontinuity points of the lens and on the liquid crystal layer side of the first board. The third electrodes are at positions corresponding to lens surfaces of the lens and on the liquid crystal layer side of the first board. The fourth electrode is provided to the whole surface on the liquid crystal layer side of the second board and includes first cutout portions formed at parts opposing the third electrodes.

11 Claims, 6 Drawing Sheets

(56) References Cited

U.S. PATENT DOCUMENTS

2012/0162592 A1* 6/2012 Takagi et al. ............... 349/139
2013/0063691 A1* 3/2013 Takama et al. ............... 349/143

FOREIGN PATENT DOCUMENTS

| JP | 2010-134981 | A | 6/2010 |
| JP | 2011-197640 | | 6/2011 |
| JP | 2011-164527 | A | 8/2011 |
| JP | 2012-027489 | A | 2/2012 |
| KR | 20120028171 | A | 3/2012 |

OTHER PUBLICATIONS

Extended European Search Report dated Aug. 23, 2013, EP Application No. 12194576.0, 4 pages.

* cited by examiner

LIQUID CRYSTAL OPTICAL ELEMENT AND IMAGE DISPLAY DEVICE

CROSS-REFERENCE TO RELATED APPLICATIONS

This application is based upon and claims the benefit of priority from Japanese Patent Application No. 2012-103579, filed on Apr. 27, 2012, the entire contents of which are incorporated herein by reference.

FIELD

Embodiments described herein relate generally to a liquid crystal optical element and an image display device.

BACKGROUND

Conventionally, there has been known a liquid crystal optical element that utilizes the birefringence of a liquid crystal molecule and applies a voltage to the liquid crystal molecule to change a refractive index distribution. Furthermore, there has been proposed a stereoscopic image display device that is constituted by combining the liquid crystal optical element and an image display module.

In the above-mentioned stereoscopic image display device, the refractive index distribution of the liquid crystal optical element is changed between a state in which an image displayed on the screen of the image display module is made incident on the eyes of a viewer as it is and a state in which the image displayed on the screen of the image display module is made incident on the eyes of the viewer as a plurality of parallax images. Due to such a constitution, a two-dimensional display operation and a three-dimensional image display operation are realized. Furthermore, there has been known a technique for utilizing the optical principle of a Fresnel zone plate to change the optical path of light.

However, in the above-mentioned conventional art, the controllability of the liquid crystal molecule is not considered particularly and hence, there exists a case that it becomes difficult to realize the intended refractive-index-distribution characteristics of a lens. In this case, it is impossible to obtain desired condensing performance thus giving rise to a drawback that image quality in displaying a stereoscopic image is deteriorated.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a liquid crystal optical element comprises: a first board; a second board; a liquid crystal layer; a plurality of first electrodes; a plurality of second electrodes; a plurality of third electrodes; and a fourth electrode. The liquid crystal layer is configured to be sandwiched between the first board and the second board. The liquid crystal optical element generates refractive index distribution functioning as a lens by application of a voltage to the liquid crystal layer. The first electrodes are configured to be provided at positions corresponding to end portions of the lens and on the liquid crystal layer side of the first board. The second electrodes are configured to be provided at positions corresponding to discontinuity points of the lens and on the liquid crystal layer side of the first board. The third electrodes are configured to be provided at positions corresponding to lens surfaces of the lens and on the liquid crystal layer side of the first board. The fourth electrode is configured to be provided to the whole surface on the liquid crystal layer side of the second board and comprises first cutout portions formed at parts opposing the third electrodes by partially removing the fourth electrode.

Hereinafter, in reference to the drawings, embodiments of a liquid crystal optical element and an image display device are explained in detail. In the following embodiments, parts for performing the identical operations are given same numerals and their repeated explanations are omitted depending on the circumstances.

Figure 1:
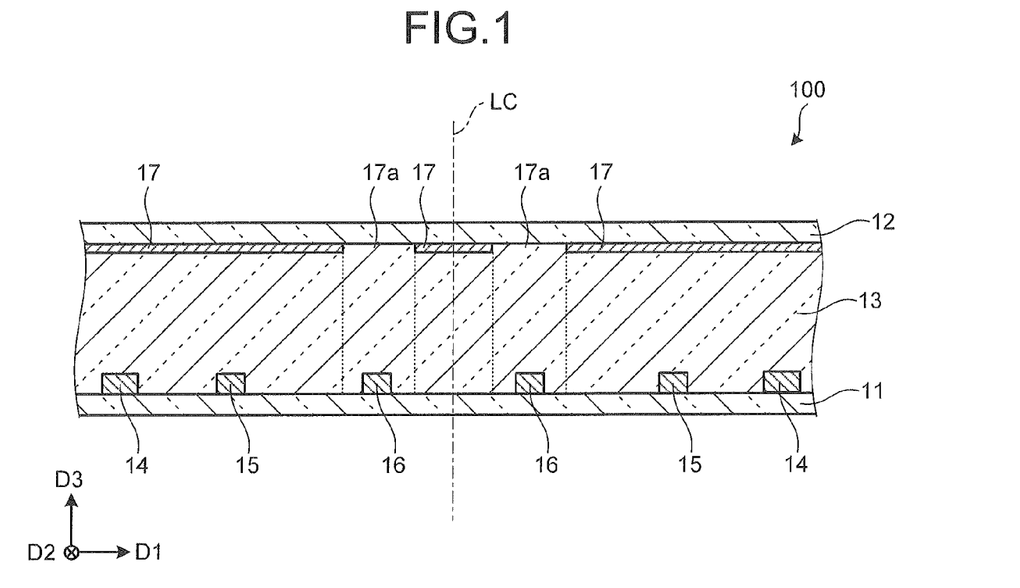
FIG. 1 is an exemplary schematic cross sectional view of a configuration of a liquid crystal optical element according to a first embodiment.
Figure 2:
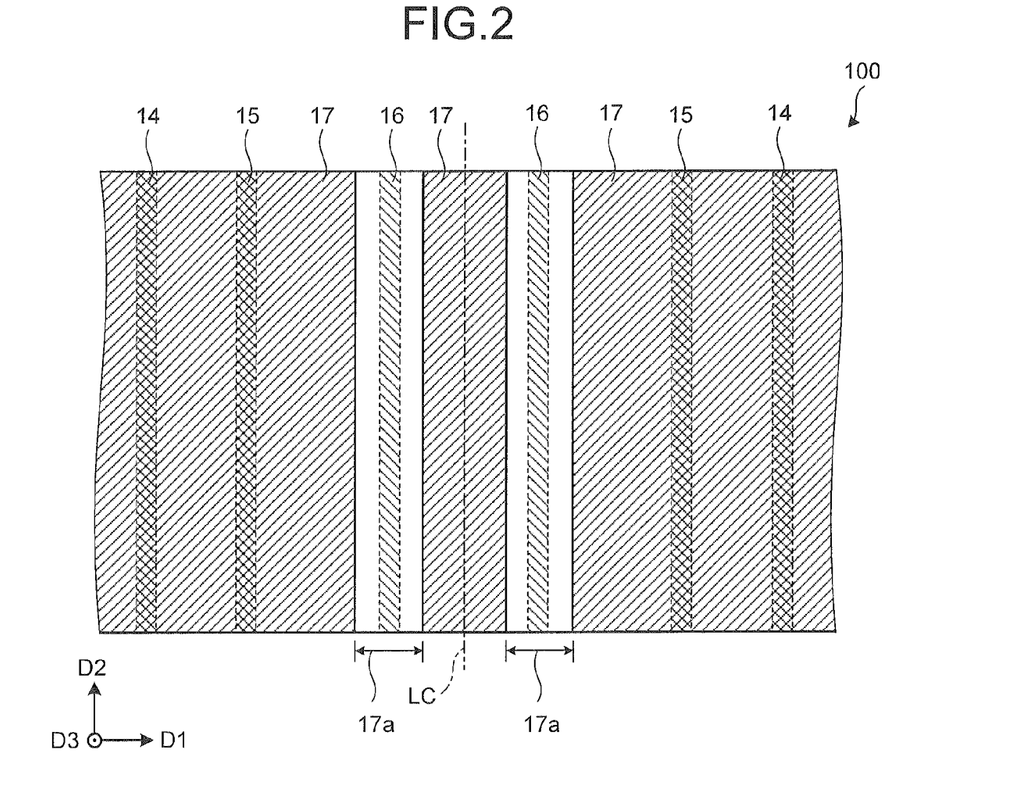
FIG. 2 is an exemplary top view of the liquid crystal optical element in the first embodiment.

FIG. 1 is a schematic cross sectional view illustrating a configuration of a liquid crystal optical element according to a first embodiment. FIG. 2 is a top view of the liquid crystal optical element in the first embodiment.

As illustrated in FIG. 1, a liquid crystal optical element 100 in the first embodiment comprises a first board 11, a second board 12 arranged opposite the first board 11, and a liquid crystal layer 13 sandwiched between the first board 11 and the second board 12.

The surface on the liquid crystal layer 13 side of the first board 11 is provided with first electrodes 14, second electrodes 15, and third electrodes 16. These first electrodes 14, second electrodes 15, and third electrodes 16 are, as illustrated in FIG. 2, provided in an extending manner in a second direction D2 that intersects with a first direction D1. FIG. 2 illustrates an example that the direction D2 is orthogonal to the first direction D1. However, the first embodiment is not limited to this example, and the second direction D2 may not be orthogonal to the first direction D1.

The first electrode 14 is arranged on the liquid crystal layer 13 side surface of the first board 11 at each position corresponding to each end of a Fresnel lens described later in the first direction D1. There exists a center axis (hereinafter, referred to as a lens center LC) corresponding to the lens center of the Fresnel lens described later at a substantially-central position of the two first electrodes 14 adjacent to each other in the first direction D1 out of these first electrodes 14. The lens center LC is parallel to the second direction D2.

Furthermore, the second electrodes 15 are arranged in parallel in the first direction D1 between the two first electrodes 14 adjacent to each other. The second electrodes 15 are arranged at the respective positions corresponding to the discontinuity points of the Fresnel lens described later in line symmetry with respect to the lens center LC.

In addition, the third electrodes 16 are arranged in parallel in the first direction D1 between the two first electrodes 14 adjacent to each other. The third electrodes 16 are arranged at positions corresponding to the lens surfaces of the Fresnel lens described later in line symmetry with respect to the lens center LC. FIG. 2 illustrates an example that the third electrode 16 is provided between the lens center LC and the second electrode 15 (discontinuous point) adjacent to the lens center LC. However, the first embodiment is not limited to this example.

The surface on the liquid crystal layer 13 side of the second board 12 is provided with a fourth electrode 17. The fourth electrode 17 is provided to face the above-mentioned first electrodes 14, second electrodes 15, and third electrodes 16 in an opposed manner, and provided to extend over the whole area of the surface on the liquid crystal layer 13 side of the second board 12. Furthermore, apart of the fourth electrode 17 facing the third electrodes 16 is provided with a first cutout portion 17a formed by partially removing an electrode board.

The width (hereinafter, referred to as the cutout width) of the first cutout portion 17a in the first direction D1 is formed greater than the width (hereinafter, referred to as the electrode width) of the third electrode 16 opposing the first cutout portion 17a. Furthermore, as viewed in an opposing direction (a third direction D3) of the first board 11 and the second board 12, the area to which the first cutout portion 17a is provided is formed so as to extend over the whole area of the third electrode 16 opposing the first cutout portion 17a.

In the above-mentioned configuration, the first board 11, the second board 12, the first electrode 14, the second electrode 15, the third electrode 16, and the fourth electrode 17 have light transmissive characteristics, and are specifically transparent.

For example, transparent materials such as glass or resin are used for the first board 11 and the second board 12. The first board 11 and the second board 12 are formed in a plate-like shape or a sheet-like shape. There is no particular restriction on the thicknesses of the first board 11 and the second board 12. For example, it is possible to adopt any thickness such as thicknesses ranging from 50 micrometers ($\mu m$) to 2000 $\mu m$.

The first electrode 14, the second electrode 15, the third electrode 16, and the fourth electrode 17 contain, for example, oxides including at least one (one kind) of element selected from the group consisting of In, Sn, Zn, and Ti. For example, ITO is used for these electrodes. For example, at least any of $In_2O_3$ and $SnO_3$ may be used. The thickness of each of these electrodes is, for example, approximately 200 nanometers (nm) (ranging from 100 nm to 350 nm, for example). The thickness of the electrode is set to a thickness such that high transmissivity with respect to visible light can be obtained. Furthermore, the length (electrode width) of each of the first electrode 14, the second electrode 15, and the third electrode 16 along the first direction D1 is, for example, in the range from 5 $\mu m$ to 300 $\mu m$.

The liquid crystal layer 13 contains a liquid crystal material such as nematic liquid crystal. The liquid crystal material has positive dielectric anisotropy or negative dielectric anisotropy. In the liquid crystal layer 13 having any of an initial alignment (an alignment when a voltage is not applied to the liquid crystal layer 13) of liquid crystals and an alignment of liquid crystals when a voltage is applied to the liquid crystal layer 13, the director of a liquid crystal (the long axis of a liquid crystalmolecule) has a component (horizontal orientation) parallel to the first direction D1. In the first embodiment, the director of the liquid crystal has the horizontal orientation in the initial alignment of the liquid crystals.

A voltage is applied between the fourth electrode 17 and each of the first electrode 14, the second electrode 15, and the third electrode 16 and hence, the liquid crystal alignment in the liquid crystal layer 13 is changed. Along with the change of the liquid crystal alignment, refractive index distribution is formed in the liquid crystal layer 13. The refractive index distribution changes the direction of travel of light incident on the liquid crystal optical element 100. The change of the direction of travel of the light is mainly based on a refraction effect.

Figure 3:
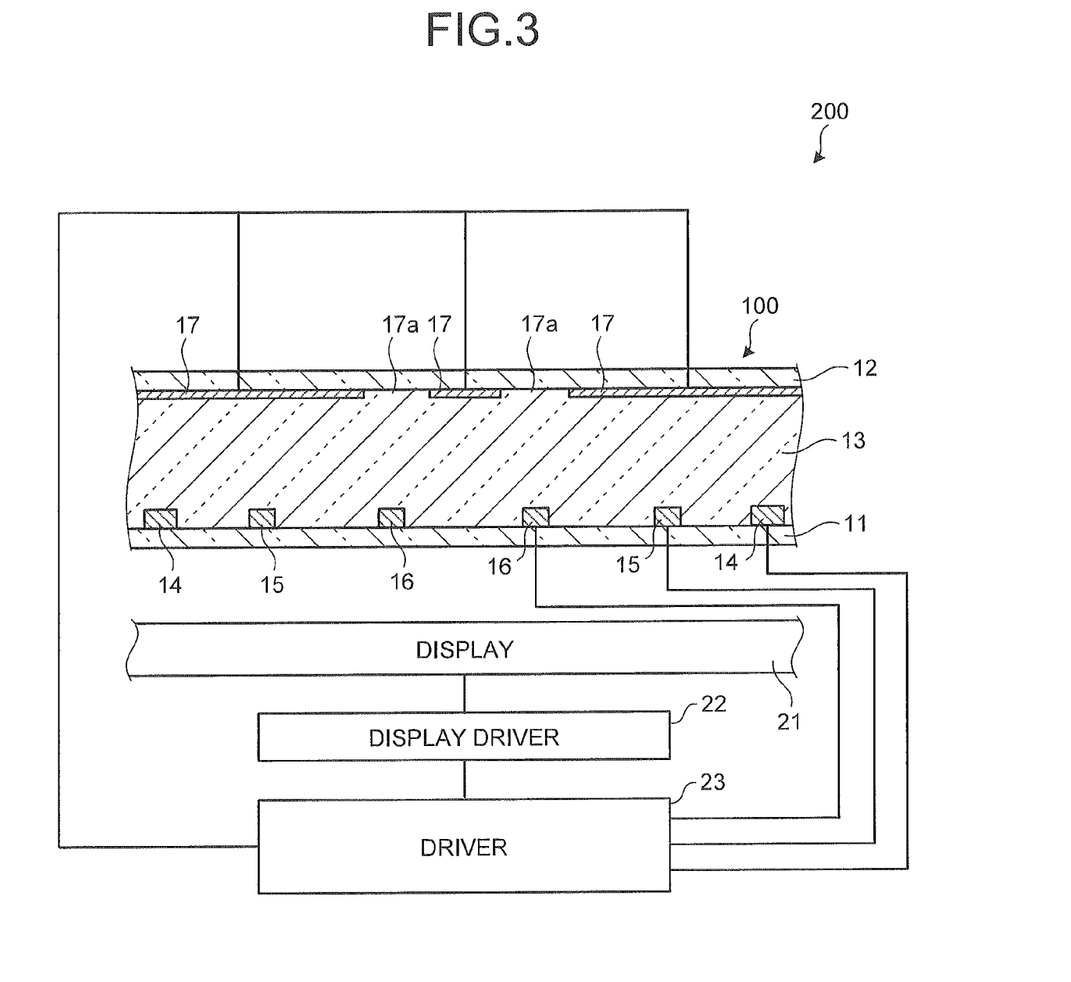
FIG. 3 is an exemplary schematic view of a configuration of an image display device in the first embodiment.

FIG. 3 is a schematic view illustrating the configuration of the image display device in the first embodiment. As illustrated in FIG. 3, an image display device 200 is provided with a display 21, a display driver 22, and a driver 23 in addition to the above-mentioned liquid crystal optical element 100.

The display 21 constitutes, for example, a display unit such as a liquid crystal display, an organic electroluminescence display, or a plasma display. The display 21 is stacked on the liquid crystal optical element 100. The display 21 causes light including image information to be incident on the liquid crystal layer 13.

The display driver 22 drives the display 21. The display 21 forms light modulated based on signals transmitted from the display driver 22. For example, the display 21 emits light including a plurality of parallax images. As described later, the liquid crystal optical element 100 assumes a state of operating so as to change an optical path and a state of operation so as not to change substantially an optical path. Light is incident on the image display device 200 assuming the state of operating so as to change the optical path and hence, the display 21 provides, for example, a three-dimensional image display. For example, in the state of operating so as not to change substantially the optical path, the image display device 200 provides, for example, a two-dimensional image display.

The driver 23 is electrically connected to the first electrodes 14, the second electrodes 15, the third electrodes 16, and the fourth electrode 17 and sets each electrode to a pre-determined electric potential. To be more specific, the driver 23 applies a first voltage between the first electrode 14 and the fourth electrode 17 and applies a second voltage between the fourth electrode 17 and each of the second electrode 15 and the third electrode 16. The driver 23 sets, for example, the electric potential of the fourth electrode 17 to GND, sets the electric potential of the first electrode 14 to V1, and sets the electric potential of each of the second electrode 15 and the third electrode 16 to V2. Accordingly, the driver 23 applies the first voltage (GND-V1) between the first electrode 14 and the fourth electrode 17 and applies the second voltage (GND-V2) between the fourth electrode 17 and each of the second electrode 15 and the third electrode 16. In the first embodiment, a state that two electrodes are set to the identical electric potential (zero (0) volt is applied therebetween) is, for the sake of convenience, included in a state that a voltage is turned on.

The application of voltage to the first electrode 14, the second electrode 15, the third electrode 16, and the fourth electrode 17 changes the liquid crystal alignment of the liquid crystal layer 13 thus forming refractive index distribution. The refractive index distribution is determined by the arrangement of the electrodes and the voltage applied to the electrode. The driver 23 may be connected to the display driver 22 by wired or wireless connection (electrically or optically). The image display device 200 may further comprise a controller (not illustrated in the drawings) that controls the driver 23 and the display driver 22.

Hereinafter, in conjunction with FIGS. 4 to 6, the refractive index distribution realized by the liquid crystal optical element 100 in the first embodiment is explained.

Figure 4:
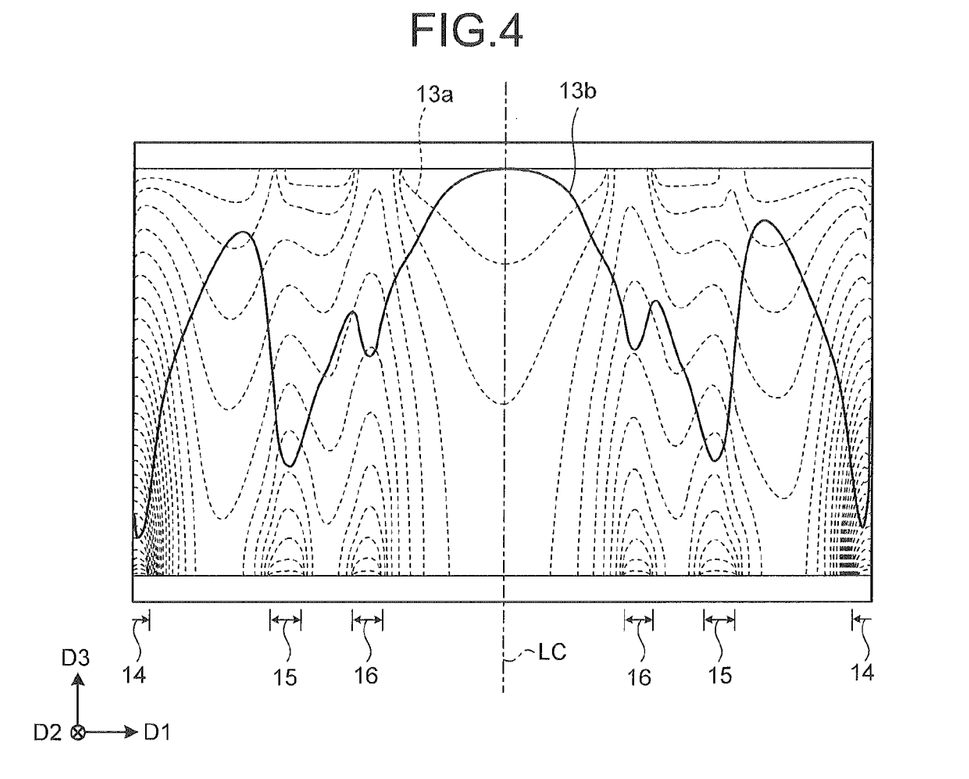
FIG. 4 is an exemplary view of a result of simulating potential distribution and refractive index distribution that are generated in a liquid crystal layer in applying a voltage to the liquid crystal optical element in the first embodiment.

When a predetermined voltage is applied to the liquid crystal optical element 100, potential distribution and the refractive index distribution in the liquid crystal layer 13 are illustrated in FIG. 4. FIG. 4 is a view illustrating one example of results of simulating the potential distribution and the refractive index distribution that are generated in the liquid crystal layer 13 in applying a voltage to the liquid crystal optical element 100. In FIG. 4, a broken line indicates an equipotential curve 13a, and a continuous line indicates a refractive index distribution curve 13b.

For example, the electric potential of the fourth electrode 17 is set to GND, and the electric potential of the first electrode 14 is set to V1 and hence, the first voltage having the electric potential difference of GND-V1 is applied between the first electrode 14 and the fourth electrode 17. Furthermore, the electric potential of each of the second electrode 15 and the third electrode 16 is set to V2 and hence, the second voltage having the electric potential difference of GND-V2 is applied between the fourth electrode 17 and each of the second electrode 15 and the third electrode 16. FIG. 4 illustrates an example in which V1>V2; however, the present embodiment is not limited to this example, and the condition of V1=V2 or V1<V2 may be accepted.

The application of the first voltage and the second voltage makes the electric potential between the fourth electrode 17 and each of the first electrode 14, the second electrode 15, and the third electrode 16 high (peak) at the positions of the first electrode 14, the second electrode 15, and the third electrode 16, and makes the electric potential between the fourth electrode 17 and each of the first electrode 14, the second electrode 15, and the third electrode 16 low (bottom) at the positions between the fourth electrode 17 and each of the first electrode 14, the second electrode 15, and the third electrode 16. Accordingly, the refractive index distribution curve 13b of the liquid crystal layer 13 has, as illustrated in FIG. 4, a shape corresponding to the distribution of the lens thicknesses in the Fresnel lens.

In this manner, the liquid crystal optical element 100 is a liquid crystal gradient index lens (GRIN lens) in which the refractive index is changed in plane and has a function of a cylindrical lens array as a whole. In the refractive index distribution curve 13b, the lens center LC corresponds to the center position of the lens in the Fresnel lens. Furthermore, the first electrode 14 is located at a position corresponding to the lens end of the Fresnel lens, and the second electrode 15 is located at the position of a discontinuity point of the Fresnel lens. In addition, the third electrode 16 (the first cutout portion 17a) is located at a position corresponding to the lens surface part of the Fresnel lens.

When focusing on a portion in which a combination of the third electrode 16 and the first cutout portion 17a exists, the electric potential applied to the region of the first cutout portion 17a becomes higher than the electric potential (GND) of the fourth electrode 17 in the vicinity of the first cutout portion 17a, and the electric potential difference in the area of the liquid crystal layer 13 corresponding to the combination of the third electrode 16 and the first cutout portion 17a becomes lower than the electric potential difference of the second voltage. Accordingly, the refractive index distribution of the liquid crystal optical element 100 exhibits, as illustrated in FIG. 4, a moderate upward tendency from the second electrode 15 to the lens center LC.

Figure 5:
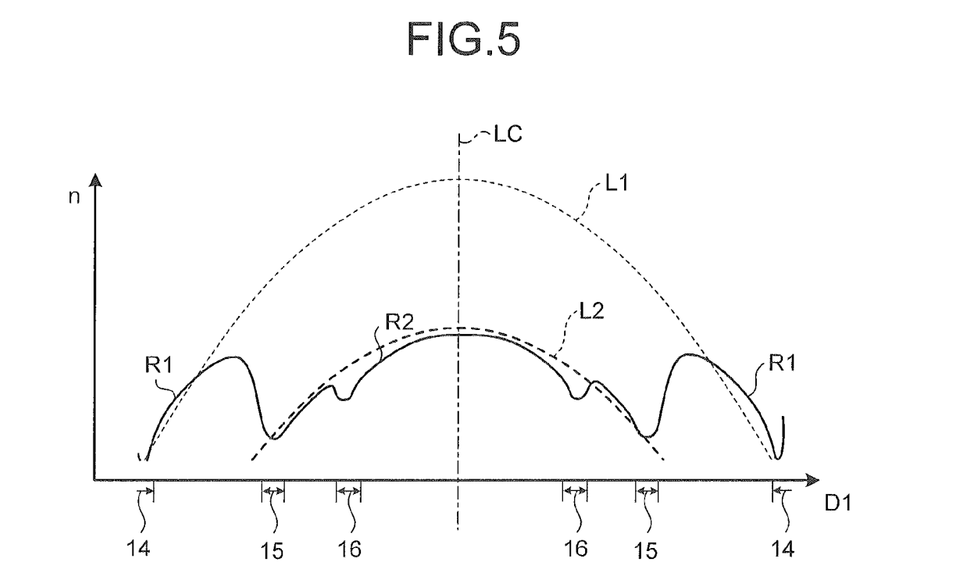
FIG. 5 is an exemplary view of, as a model, the refractive index distribution of the liquid crystal optical element in the first embodiment.

FIG. 5 is a view illustrating, as a model, the refractive index distribution of the liquid crystal optical element 100 in applying a voltage to the liquid crystal optical element 100 in the same manner as the case of FIG. 4. The axis of abscissa of the view in FIG. 5 corresponds to the first direction D1. The positions of the numerals of the electrodes on the axis of abscissa correspond to the arrangement positions of the first electrode 14, the second electrode 15, and the third electrode 16, respectively. The axis of ordinate of the view in FIG. 5 indicates a refraction index n (effective refraction index). Furthermore, L1 and L2 illustrated in FIG. 5 each indicate the intended refractive index distribution of the lens.

As illustrated in FIG. 5, in the liquid crystal optical element 100, the electric field effect of the first electrode 14, the second electrode 15, and the third electrode 16 to the liquid crystal layer 13 forms refractive index distribution R1 that realizes an outside lens. Furthermore, the electric field effect of the second electrode 15, the third electrode 16, and the fourth electrode 17 (the first cutout portion 17a) to the liquid crystal layer 13 forms refractive index distribution R2 that realizes an inside lens. A comparison of the refractive index distribution R1 or R2 with the intended refractive index distribution L1 or L2 of the lens indicates that both shapes thereof are substantially equivalent to each other thus bringing the condensing performance of the Fresnel lens constituted by using the liquid crystal optical element 100 closer to a target value.

For example, in an example that does not form a combination of the third electrode 16 and the first cutout portion 17a in the liquid crystal optical element 100, the electric field effect of a combination of the third electrode 16 and the first cutout portion 17a is not exerted on the liquid crystal layer 13. Hence, a refraction index is steeply increased from the second electrode 15 to the lens center LC.

Figure 6:
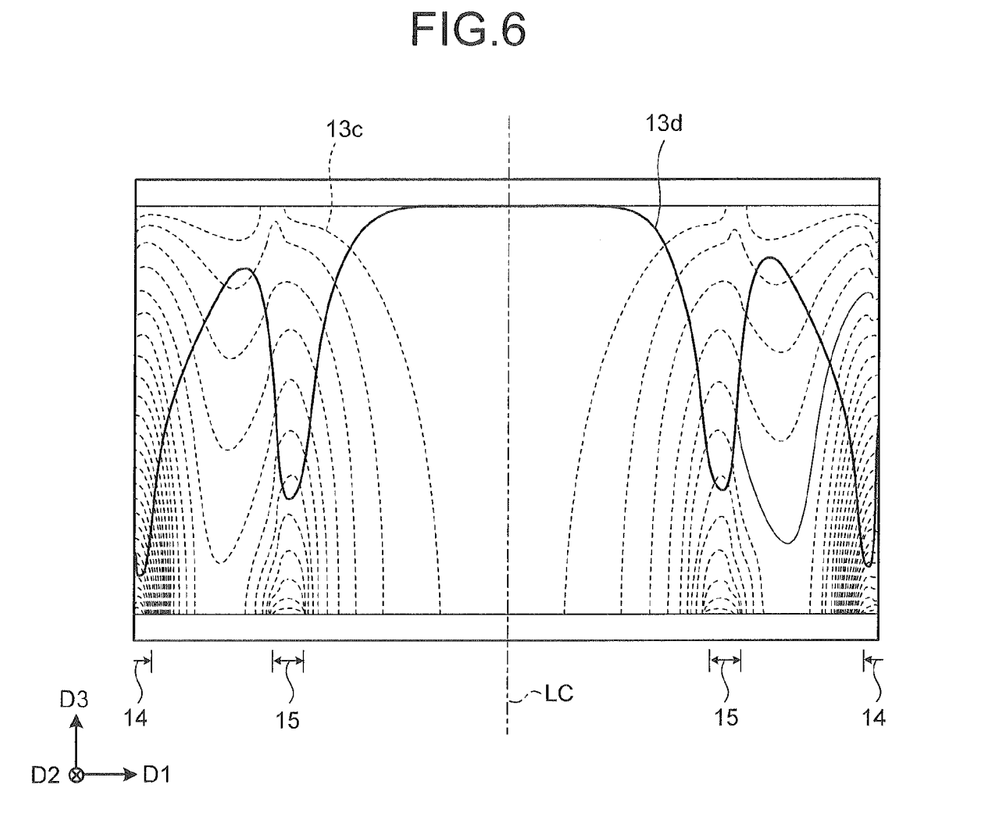
FIG. 6 is an exemplary view of a result of simulating the potential distribution and the refractive index distribution that are generated in the liquid crystal layer in applying a voltage to a liquid crystal optical element in which a third electrode and a first cutout portion are not formed.

FIG. 6 is a view illustrating one example of results of simulating the potential distribution and the refractive index distribution that are generated in the liquid crystal layer 13 in applying a voltage to a liquid crystal optical element in which the third electrode 16 or the first cutout portion 17a are not formed. In FIG. 6, a broken line indicates an equipotential curve 13c, and a continuous line indicates a refractive index distribution curve 13d.

In FIG. 6, in the same condition as the case of FIG. 4, when the electric potentials of the fourth electrode 17, the first electrode 14, and the second electrode 15 are respectively set to GND, V1, and V2, the refractive index distribution curve 13d has a shape corresponding to the distribution of the lens thicknesses in the Fresnel lens in the same manner as the case of FIG. 4. However, the refractive index is steeply changed from the second electrode 15 to the lens center LC and hence, the shape of refractive index distribution curve 13d in a range corresponding to the central portion of the lens becomes flattened compared with the refractive index distribution curve 13b illustrated in FIG. 4. In this case, the shape of the refractive index distribution illustrated in FIG. 6 is not along the shape of the intended refractive index distribution of the lens and hence, it is impossible to obtain an intended condensing performance thus giving rise to a drawback that an image quality in displaying the stereoscopic image is deteriorated.

Whereas, in the liquid crystal optical element 100 according to the first embodiment, due to the effect of the combination of the third electrode 16 and the first cutout portion 17a, the lens surface (refractive index) of the Fresnel lens can be formed more smoothly thus eliminating the above-mentioned drawback.

As described heretofore, with the liquid crystal optical element 100 (image display device 200) in the first embodiment, a combination of the third electrode 16 and the first cutout portion 17a is provided to a lens-surface portion thus improving the controllability of electric field distribution. Furthermore, the combination of the third electrode 16 and the first cutout portion 17a is provided to a lens-surface portion thus applying various voltages to the liquid crystal layer 13 even when power supply systems (types of voltages) are available in limited numbers. Due to such a constitution, it is possible to realize easily intended refractive index distribution characteristics thus obtaining excellent lens effects. Furthermore, it is possible to improve the refractive index distribution characteristics and provide the image display device 200 capable of realizing high-definition display.

The above-mentioned embodiment adopts the configuration that one third electrode 16 is provided between the lens center LC and the first electrode 14 (or the second electrode 15). However, the embodiment is not limited to this configuration, and a configuration that the two or more third electrodes 16 are provided between the lens center LC and the first electrode 14 (or the second electrode 15) may be adopted. Hereinafter, a liquid crystal optical element in this configuration is explained in conjunction with FIG. 7.

Figure 7:
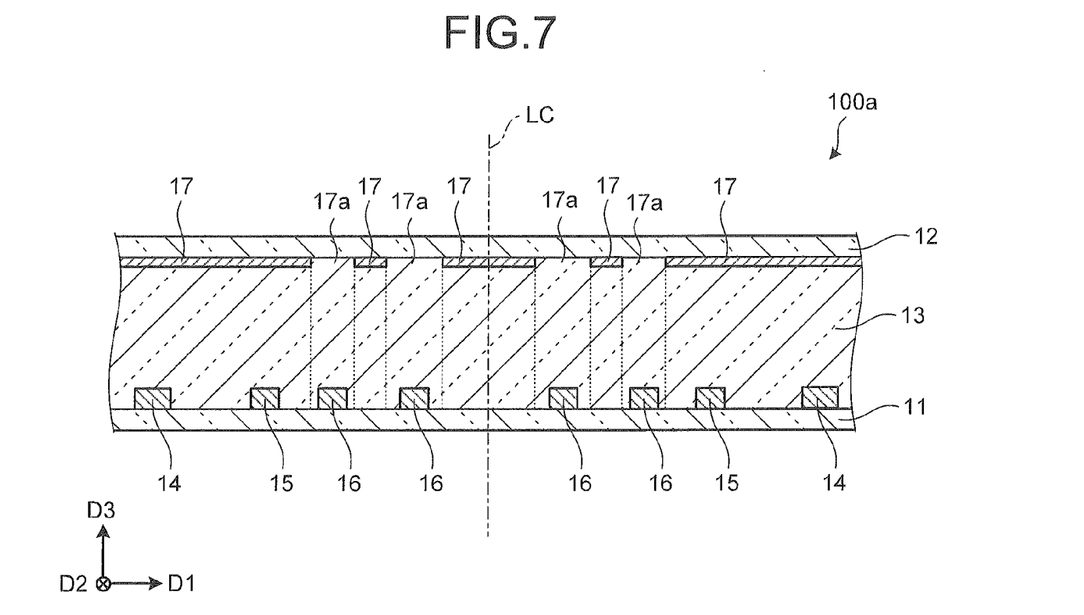
FIG. 7 is an exemplary schematic cross sectional view of a configuration of a second liquid crystal optical element in the first embodiment.

FIG. 7 is a schematic cross sectional view illustrating the constitution of a second liquid crystal optical element 100a in the first embodiment. As the liquid crystal optical element 100a in the first embodiment, an example in which two third electrodes 16 are provided between the lens center LC and the first electrode 14 (the second electrode 15) is illustrated. Furthermore, the first cutout portion 17a corresponding to each third electrode 16 is provided on the second board 12. The first cutout portion 17a opposing the third electrode 16 is formed greater in a width as the distance between the third electrode 16 and the lens center LC decreases.

As illustrated in FIG. 7, as viewed in the opposing direction (the third direction D3) of the first board 11 and the second board 12, the first cutout portion 17a is formed greater in a width as a distance between the position of an area to which the first cutout portion 17a is provided and the lens center LC decreases. To be more specific, in the lens (the inside lens in FIG. 5) of the lens surface in an area corresponding to a position at which the third electrode 16 is provided, the width of the first cutout portion 17a is formed in such a manner that the ratio of the cutout width of the first cutout portion 17a to the width of the third electrode 16 on the end side of the lens is larger than that on the center side of the lens. Due to such configuration, the lens surface to be formed by a pair of third electrodes 16 can be formed more smoothly.

The position of setting the third electrode 16 is not limited to the position of the lens surface of the inside lens (between the lens center and the second electrode 15). The third electrode 16 may be configured to be provided to the position of the lens surface of an outside lens (between the first electrode 14 and the second electrode 15). Furthermore, in this configuration also, in the same manner as the case of FIG. 7, the cutout width of the first cutout portion 17a in the first direction D1 is formed so as to have a size corresponding to the distance between the corresponding third electrode 16 and the lens center LC that are spaced apart from each other.

In the above-mentioned embodiment, the first electrode 14, the second electrode 15, and the third electrode 16 are configured to be provided on the first board 11. However, the embodiment is not limited to this configuration, and the other electrodes may be configured to be provided. For example, as illustrated in FIG. 8, a center electrode 18 may be configured to be provided to the portion of the first board 11 at the lens center LC.

Figure 8:
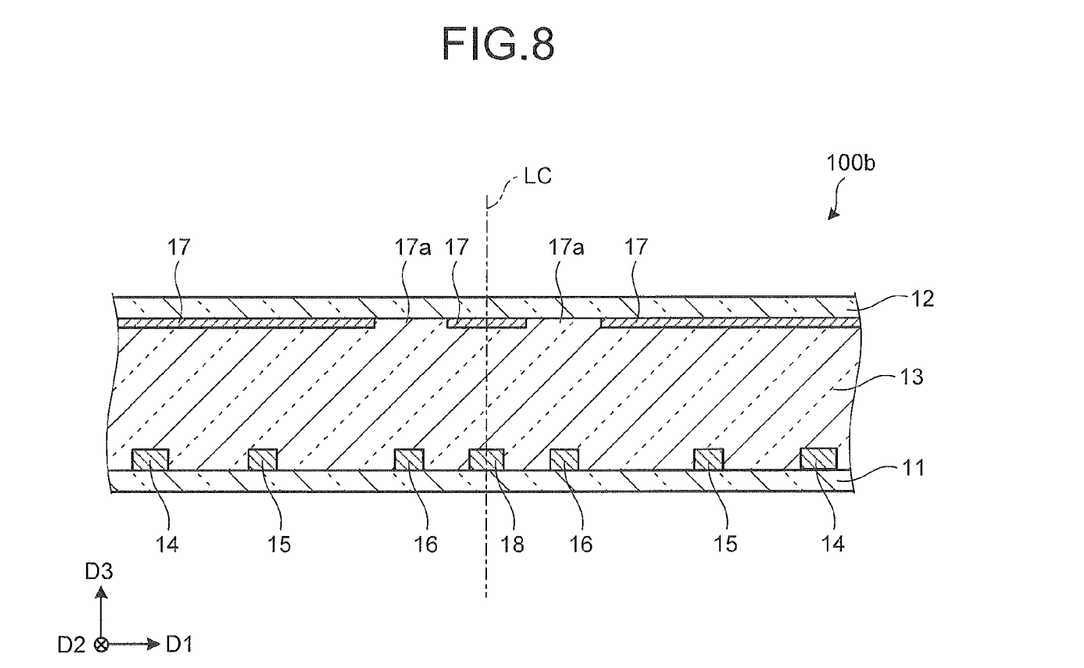
FIG. 8 is an exemplary schematic cross sectional view of a configuration of a third liquid crystal optical element in the first embodiment.

FIG. 8 is a schematic cross sectional view illustrating the constitution of a third liquid crystal optical element 100b in the first embodiment. As illustrated in FIG. 8, As the liquid crystal optical element 100b in the first embodiment, an example in which the center electrode 18 is provided to the portion of the first board 11 at the lens center LC is illustrated. When this configuration is adopted, a voltage (GND) whose value is identical with that of the voltage that is applied to the fourth electrode 17 is applied to the center electrode 18 thus holding the director of the liquid crystal at the portion of the lens center LC in horizontal orientation. Due to such configuration, it is possible to suppress the effect of the third electrode 16 in the vicinity of the lens center LC to the portion of the liquid crystal at the lens center LC thus providing the liquid crystal optical element 100b having excellent refractive index distribution characteristics.

Furthermore, in the above-mentioned embodiment, the fourth electrode 17 is configured to form the cutout portion (the first cutout portion 17a) in a portion thereof facing the third electrode 16 in an opposed manner. However, the embodiment is not limited to this constitution, and the fourth electrode 17 may be configured to form the cutout portion in the other portion thereof. For example, as illustrated in FIG. 9, the fourth electrode 17 may be configured to form the cutout portion at a position corresponding to the second electrode 15.

Figure 9:
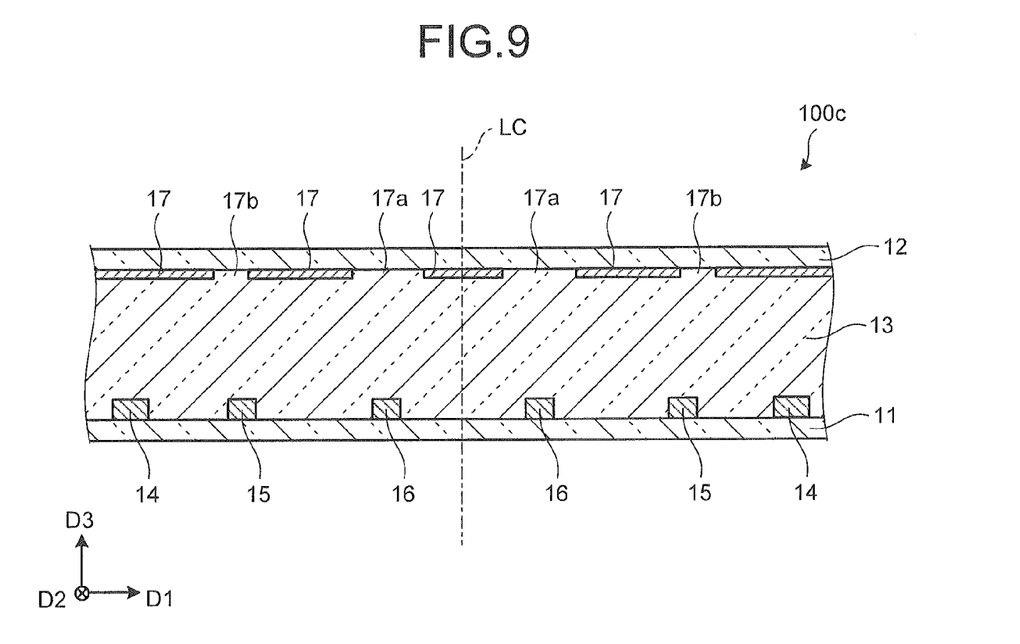
FIG. 9 is an exemplary schematic cross sectional view of a configuration of a fourth liquid crystal optical element in the first embodiment.

FIG. 9 is a schematic cross sectional view illustrating the constitution of a fourth liquid crystal optical element 100c in the first embodiment. As illustrated in FIG. 9, in the liquid crystal optical element 100c in the first embodiment, the fourth electrode 17 is provided with a plurality of second cutout portions 17b formed by partially removing the electrode board in the same manner as the case of the first cutout portion 17a.

The second cutout portion 17b is provided to the portion of the fourth electrode 17 opposing the second electrode 15. There is no particular restriction on the cutout width of the second cutout portion 17b in the first direction D1. For example, the cutout width of the second cutout portion 17b may be equivalent to, or not less than the electrode width of the second electrode 15 corresponding thereto. Furthermore, as viewed in the opposing direction (the third direction D3) of the first board 11 and the second board 12, an area to which the second cutout portion 17b is provided may be in the vicinity of the second electrode 15 corresponding thereto. The area to which the second cutout portion 17b is provided may be configured to extend over the whole area or a part of the second electrode 15, and may be configured so as not to overlap with the second electrode 15.

When this configuration is adopted, an electric field between the second electrode 15 and the fourth electrode 17 is affected by the second cutout portion 17b corresponding to the second electrode 15. Due to such a constitution, refractive index distribution can be easily formed in the part of the second cutout portion 17b in an asymmetric shape with respect to the electrode. Accordingly, it is possible to form the refractive index distribution of a lens shape close to the discontinuous refractive index distribution of the ideal Fresnel lens.

In FIG. 9, one second electrode 15 is configured to be provided between the first electrode 14 and the lens center LC. However, the embodiment is not limited to this configuration, and the two or more second electrodes 15 may be configured to be provided. In this case, the second cutout portion 17b opposing each second electrode 15 may be configured to be formed greater in a width as the distance between the second electrode 15 and the lens center LC decreases. Furthermore, as viewed in the opposing direction (the third direction D3) of the first board 11 and the second board 12, the second cutout portion 17b may be configured to be formed greater in a width as the distance between the position of an area to which the second cutout portion 17b is provided and the lens center LC decreases.

Figure 10:
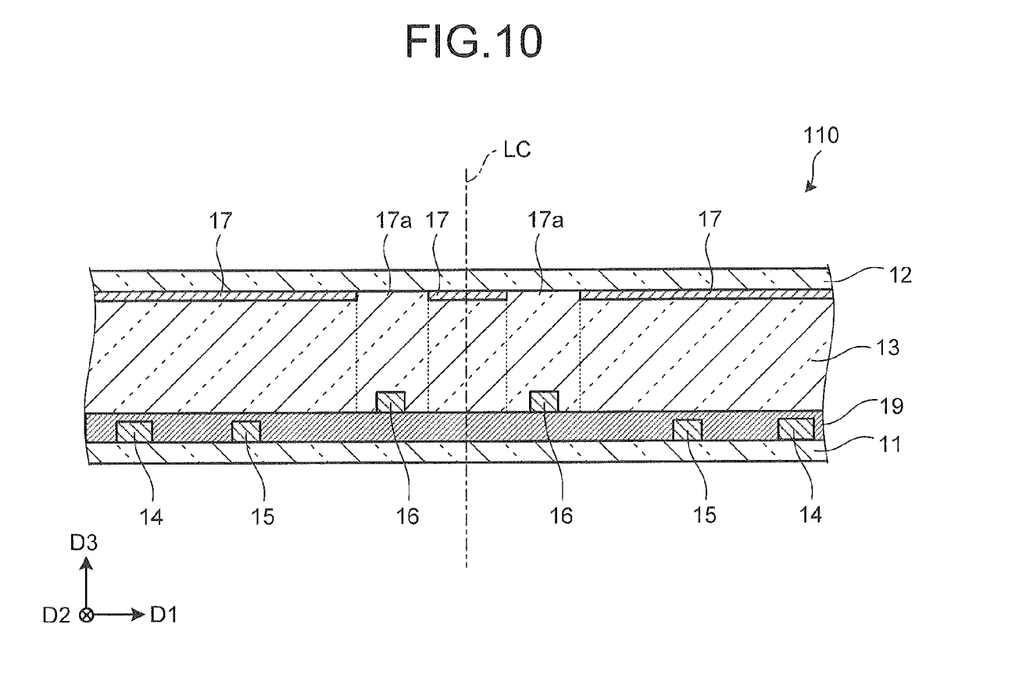
FIG. 10 is an exemplary schematic cross sectional view of a configuration of a liquid crystal optical element according to a second embodiment.

FIG. 10 is a schematic cross sectional view illustrating a configuration of a liquid crystal optical element according to a second embodiment. As illustrated in FIG. 10, a liquid crystal optical element 110 in the second embodiment comprises the first board 11, the second board 12 arranged to face the first board 11 in an opposed manner, and the liquid crystal layer 13 sandwiched between the first board 11 and the second board 12.

The surface on the liquid crystal layer 13 side of the first board 11 is provided with the first electrodes 14 and the second electrodes 15. The first electrodes 14 and the second electrodes 15 are embedded in an insulation layer 19 provided to the surface on the liquid crystal layer 13 side of the first board 11. As the material of the insulation layer 19, $SiO_2$ or the like is used. Furthermore, the thickness of the insulation layer 19 is, for example, within a range from 100 nm to 1000 nm. Due to such a constitution, it is possible to obtain appropriate insulation properties and high light transmittance.

The third electrodes 16 are arranged on the insulation layer 19 in parallel in the first direction D1. The third electrodes 16 are provided at positions corresponding to the lens surfaces in line symmetry with respect to the lens center LC. FIG. 10 illustrates an example that provides the third electrode 16 between the lens center LC and the second electrode 15. However, the present embodiment is not limited to this example.

The surface on the liquid crystal layer 13 side of the second board 12 is provided with the fourth electrode 17. The fourth electrode 17 is provided so as to face the above-mentioned first electrode 14, second electrode 15, and third electrode 16, and provided to the whole surface on the liquid crystal layer 13 side of the second board 12. Furthermore, a part of the fourth electrode 17 opposing the third electrodes 16 is provided with the first cutout portion 17a. The relationship between the electrode width of the third electrode 16 and the cutout width of the first cutout portion 17a is established in the same manner as the case of the above-mentioned first embodiment.

In the above-mentioned configuration illustrated in FIG. 10, for example, the electric potential of the fourth electrode 17 is set to GND, the electric potential of the first electrode 14 is set to V1, and the electric potentials of the second electrode 15 and the third electrode 16 are set to V2. In this case also, in the same manner as the case of the first embodiment, due to the effect of the combination of the third electrode 16 and the first cutout portion 17a, the lens surface (refractive index) can be formed more smoothly. Hence, the refraction index distribution characteristics of the liquid crystal optical element 110 can be brought close to the intended refraction index distribution characteristics.

As described heretofore, with the liquid crystal optical element 110 in the second embodiment, in the same manner as the case of the above-mentioned first embodiment, the intended refraction index distribution characteristics can be easily realized thus obtaining excellent lens effects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal optical element comprising:
   a first board;
   a second board;
   a liquid crystal layer sandwiched between the first board and the second board, the liquid crystal optical element being configured to generate a refractive index distribution functioning as a Fresnel lens by application of a voltage to the liquid crystal layer;
   a plurality of first electrodes provided at first positions corresponding to end portions of the Fresnel lens and on the liquid crystal layer side of the first board;
   a plurality of second electrodes provided at second positions on the liquid crystal layer side of the first board between the first positions;
   a plurality of third electrodes provided at third positions on the liquid crystal layer side of the first board, the third positions between the second positions;
   a fourth electrode provided to a surface on the liquid crystal layer side of the second board and comprising first slits formed at parts overlapping the third electrodes by partially removing the fourth electrode, wherein
   a width of each of the first slits is formed to be greater than a width of each of the third electrodes opposing each of the first slits; and
   first, second, and third voltages are provided between the fourth electrode and the first, second, and third electrodes, respectively, in order to generate the refractive index distribution.

2. The liquid crystal optical element of claim 1, wherein, as viewed in an opposing direction of the first board and the second board, an area to which each of the first slits is provided comprises a whole area of each of the third electrodes opposing the each of the first slits.

3. The liquid crystal optical element of claim 1, wherein
   the third electrodes are arranged between a central axis of the Fresnel lens and each of the first electrodes, and
   a width of each of the first slits opposing each of the third electrodes is formed greater in a width as a distance between the each of the third electrodes and the central axis decreases.

4. The liquid crystal optical element of claim 1, wherein
   a plurality of the first slits are arranged in the second board, and,
   as viewed in an opposing direction of the first board and the second board, each of the first slits is formed greater in a width as a distance between a central axis of the Fresnel lens and a position of an area to which the each of the first slits is provided decreases.

5. The liquid crystal optical element of claim 1, wherein the first electrodes and the second electrodes are embedded in an insulation layer provided to the liquid crystal layer side of the first board, and
the third electrodes are provided at a position on the liquid crystal layer side of the insulation layer.

6. The liquid crystal optical element of claim 1, wherein second slits are provided at positions corresponding to the second electrodes and on the fourth electrode.

7. The liquid crystal optical element of claim 6, wherein the second electrodes are arranged between a central axis of the Fresnel lens and each of the first electrodes, and
each of the second slits opposing the second electrodes is formed greater in a width as a distance between each of the second electrodes and the central axis decreases.

8. The liquid crystal optical element of claim 6, wherein a plurality of the second slits are arranged in the second board, and,
as viewed in an opposing direction of the first board and the second board, each of the second slits is formed greater in a width as a distance between the central axis and a position of an area to which the each of the second slits is provided decreases.

9. The liquid crystal optical element of claim 1, wherein the first electrodes, the second electrodes, and the third electrodes are provided in symmetry with respect to a central axis of the Fresnel lens.

10. The liquid crystal optical element of claim 1, further comprising:
a fifth electrode provided at a position corresponding to a central axis of the Fresnel lens and on the liquid crystal layer side of the first board.

11. An image display device comprising:
the liquid crystal optical element of claim 1; and
an image display module comprising a display stacked on the liquid crystal optical element and causing light including image information to be incident on the liquid crystal layer comprised in the liquid crystal optical element.

* * * * *